(12) United States Patent
Sauquet et al.

(10) Patent No.: US 11,591,002 B2
(45) Date of Patent: Feb. 28, 2023

(54) STEERING COLUMN IMPACT ENERGY ABSORBER, WITH LOOP CLOSED BY A BREAKAWAY LINK

(71) Applicant: Robert Bosch Automotive Steering Vendôme, Vendome (FR)

(72) Inventors: Mickael Sauquet, Villerable (FR); Eddy Dupont, Vendome (FR)

(73) Assignee: Robert Bosch Automotive Steering Vendome, Vendome (FR)

( * ) Notice: Subject to any disclaimer, the term of this patent is extended or adjusted under 35 U.S.C. 154(b) by 0 days.

(21) Appl. No.: 17/414,775

(22) PCT Filed: Dec. 16, 2019

(86) PCT No.: PCT/EP2019/085466
§ 371 (c)(1),
(2) Date: Jun. 16, 2021

(87) PCT Pub. No.: WO2020/127131
PCT Pub. Date: Jun. 25, 2020

(65) Prior Publication Data
US 2022/0073125 A1 Mar. 10, 2022

(30) Foreign Application Priority Data
Dec. 20, 2018 (FR) ...................................... 1873645

(51) Int. Cl.
*B62D 1/181* (2006.01)
*B62D 1/184* (2006.01)
*B62D 1/19* (2006.01)

(52) U.S. Cl.
CPC ............. *B62D 1/181* (2013.01); *B62D 1/184* (2013.01); *B62D 1/192* (2013.01); *B62D 1/195* (2013.01)

(58) Field of Classification Search
CPC ........ B62D 1/181; B62D 1/184; B62D 1/192; B62D 1/195
See application file for complete search history.

(56) References Cited

U.S. PATENT DOCUMENTS 7,490,855 B2 * 2/2009 Inayoshi ................ B62D 1/195
280/777
9,828,019 B2 * 11/2017 Dubay .................... B62D 1/195
(Continued)

FOREIGN PATENT DOCUMENTS

DE 10 2018 204 735 A1 10/2018

OTHER PUBLICATIONS

International Search Report corresponding to PCT Application No. PCT/EP2019/085466, dated Mar. 19, 2020 (French and English language document) (5 pages).

*Primary Examiner* — Drew J Brown
(74) *Attorney, Agent, or Firm* — Maginot, Moore & Beck LLP

(57) ABSTRACT

An absorber of steering column shock energy includes a plastically deformable part forming a loop, a breakaway link closing this loop on itself, and a first attachment interface and a second attachment interface separate from the breakaway link and arranged on either side of the loop. The part and the fusible link are arranged so that the exertion of forces in opposite directions on the first attachment interface and on the second attachment interface respectively, causes a stress leading to a deformation of the loop, breaking of the breakaway link and further deformation of the loop after this break.

10 Claims, 4 Drawing Sheets

(56) References Cited

U.S. PATENT DOCUMENTS

| | | | |
|---|---|---|---|
| 10,099,715 B2* | 10/2018 | Bodtker | B62D 1/19 |
| 10,421,477 B2* | 9/2019 | Fricke | B62D 1/184 |
| 2007/0228716 A1* | 10/2007 | Menjak | B62D 1/192 |
| | | | 280/777 |
| 2008/0023952 A1* | 1/2008 | Manwaring | B62D 1/195 |
| | | | 280/777 |
| 2014/0251059 A1 | 9/2014 | Russell et al. | |
| 2015/0232117 A1 | 8/2015 | Stinebring et al. | |

* cited by examiner

[Fig. 1]
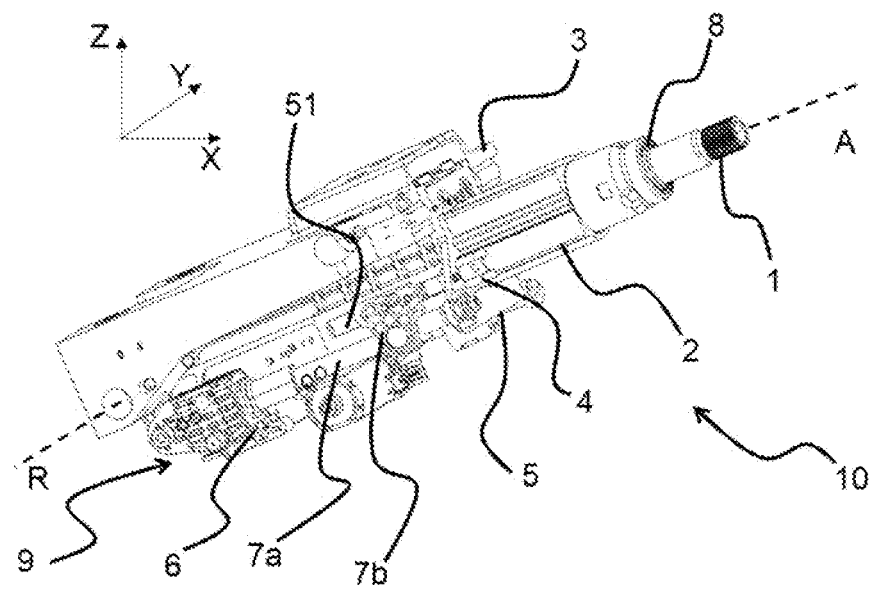
[Fig. 2]
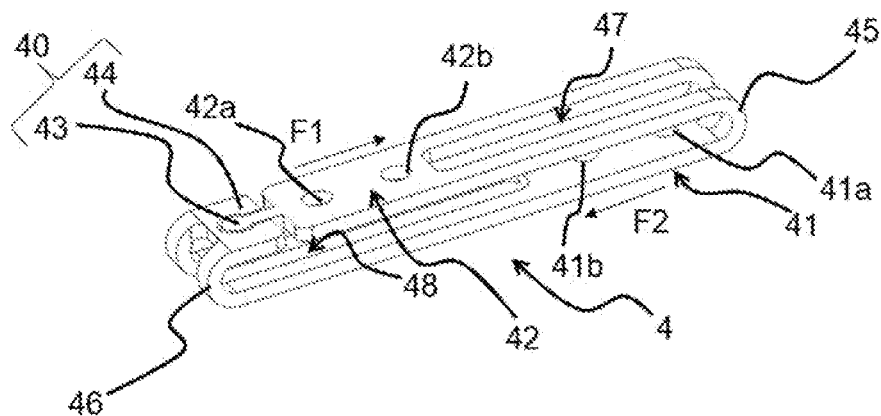
[Fig. 3]
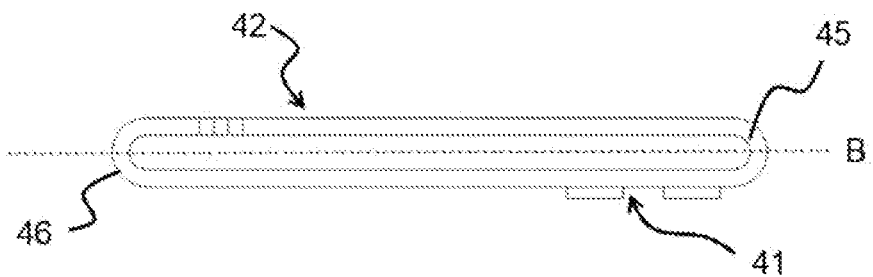

[Fig. 4]
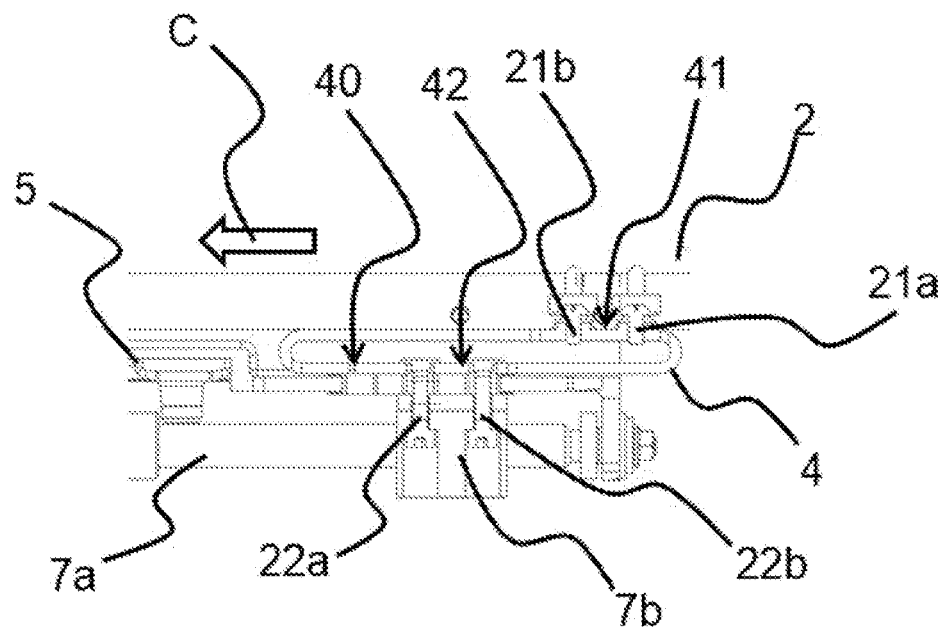
[Fig. 5a]
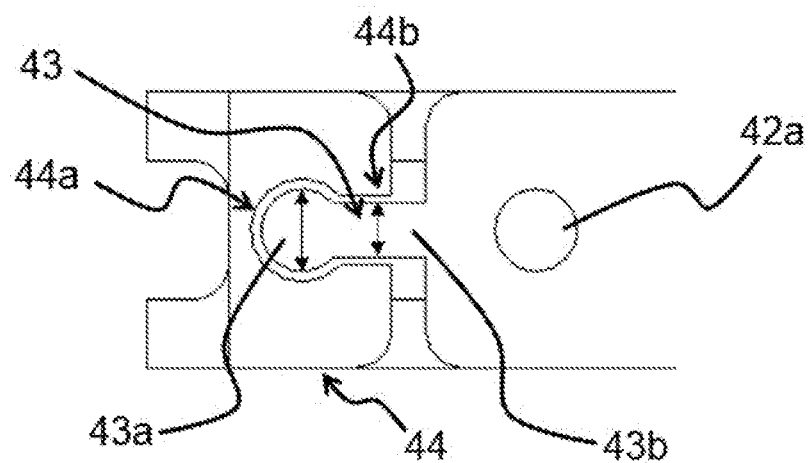

[Fig. 5b]
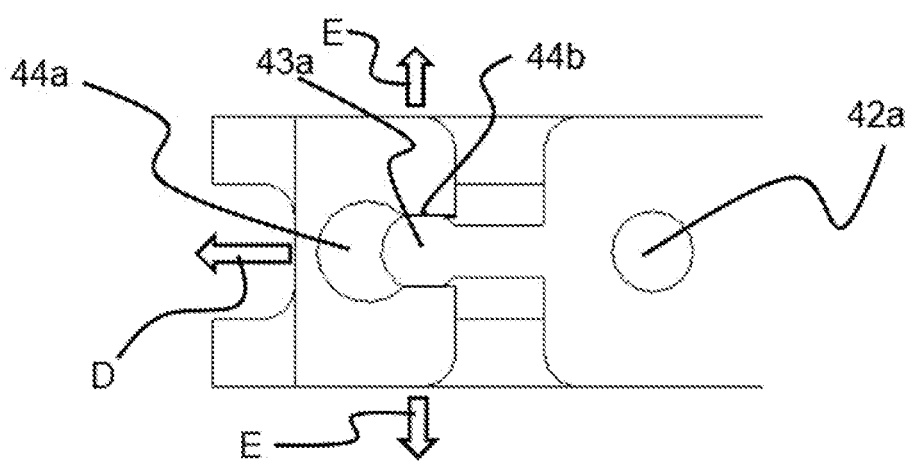
[Fig. 7]
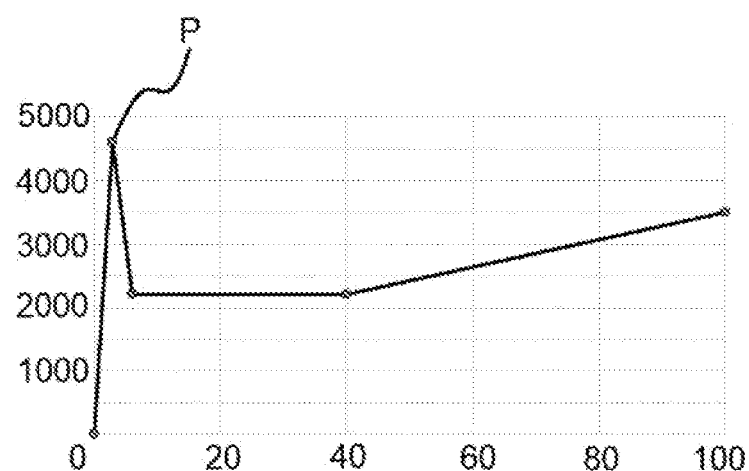

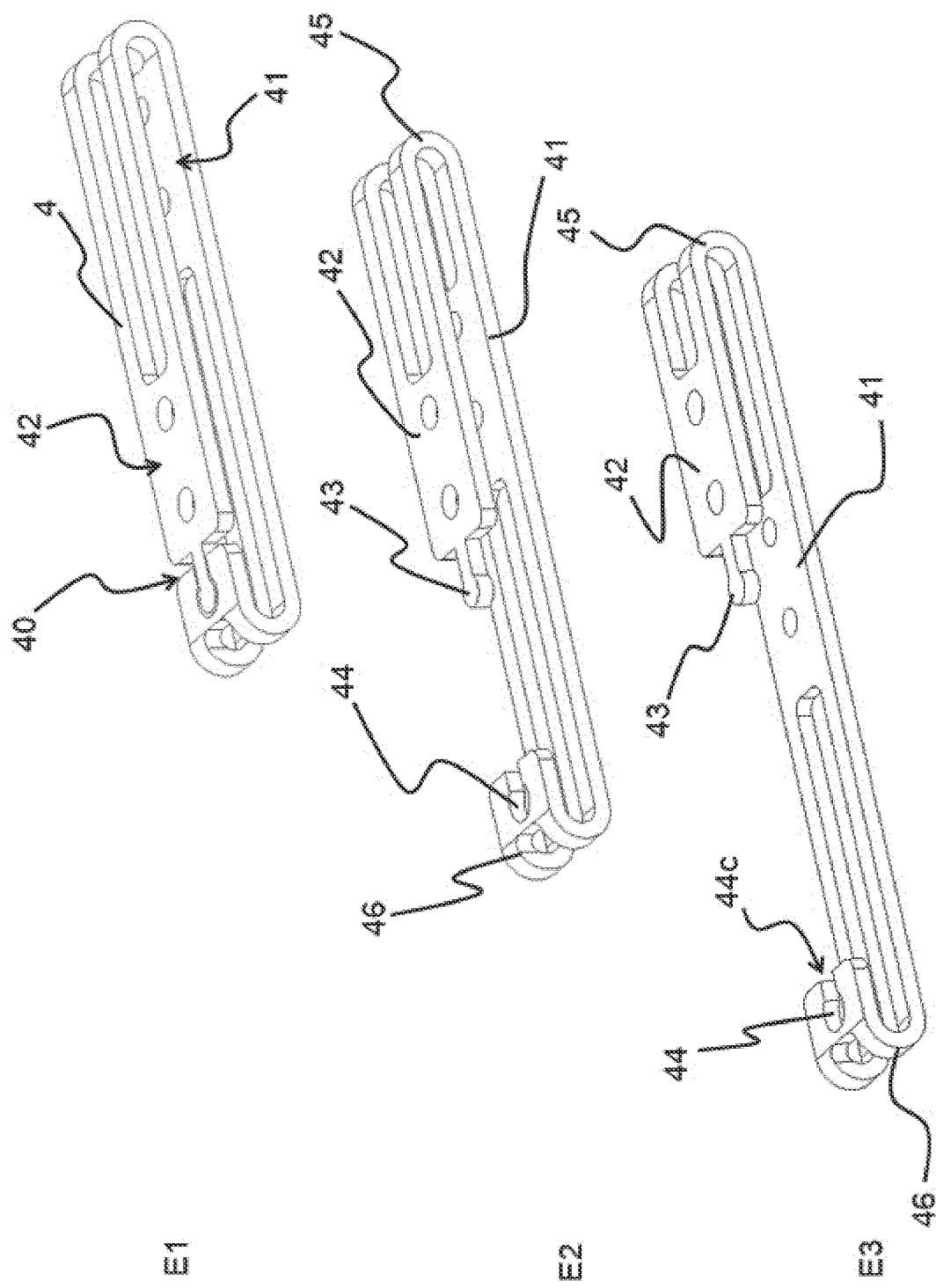
[Fig. 6]

STEERING COLUMN IMPACT ENERGY ABSORBER, WITH LOOP CLOSED BY A BREAKAWAY LINK

This application is a 35 U.S.C. § 371 National Stage Application of PCT/EP2019/085466, filed on Dec. 16, 2019, which claims the benefit of priority to Serial No. FR 1873645, filed on Dec. 20, 2018 in France, the disclosures of which are incorporated herein by reference in their entirety.

The present disclosure relates to the field of vehicle steering columns. More specifically, the present disclosure relates to an energy absorption device intended to be mounted on a steering column and designed to absorb energy if the vehicle has a frontal impact.

BACKGROUND

The steering column amongst other things maintains the position of the steering wheel in the vehicle. In an accident, the driver may strike the steering wheel. The steering wheel then needs to move toward the dashboard so as not to injure the driver. This movement needs to occur under a controlled force so as to manage the absorption of energy during the impact.

Present-day motor vehicles are, for the most part, equipped with a system for absorbing energy in the event of an impact, notably of the driver against the steering wheel. Depending on the configuration of the vehicle, the automotive manufacturer sometimes requires this control to comprise first of all a high force to set the steering wheel in motion, followed by a lower force as the steering wheel covers the travel of its movement. The difficulty then is in managing this high force at the start of the crash.

Most known devices involve adding a breakaway element which will then break at the beginning of the impact and thus create a high short-lift force. The disadvantage is that this breakaway element requires a specific operation for assembling the breakaway element on the sliding components of the steering column.

Other known systems work by the interaction between a specific shape of an impact absorber member formed of a plastically deformable strip and of another component of the column in order to create this peak force. One disadvantage is that the peak force is dependent on the tolerances and the fitting-together between the two components; and so the tolerance on the force generated is then difficult to control.

In addition, the fitting-together of various components leads to proximities which may generate noisiness as a result of vibrations in the vehicle.

SUMMARY

It is therefore an objective of the present disclosure to simplify the creation of an energy absorption device.

To do that, a first subject-matter of the disclosure relates to a steering column impact energy absorber comprising:
  a plastically deformable component forming a loop,
  a breakaway link closing this loop on itself,
  a first fixing interface and a second fixing interface, these fixing interfaces being distinct from the breakaway link and arranged on either side of the loop,
the plastically deformable component and the breakaway link being arranged in such a way that the application of forces in opposite directions to the first fixing interface and to the second fixing interface respectively leads to a stress that tends to cause the loop to deform, the breakaway link to break, and the deformation of the loop to continue after said breakage.

Thus, this absorber is formed by a single loop, closed on itself by a simple link. It is therefore simpler to produce.

Furthermore, the design and fitting of the breakaway link are focused on this plastically deformable component. Thereafter, all that is required is for the loop to be fixed on either side to two elements of a steering column that are able to move relative to one another in the event of an impact, the first fixing interface being fixed to one of these elements and the second fixing interface being fixed to the other of these elements. Control is then essentially dependent on the plastically deformable component rather than on the link to the other components of the column. The design and assembly of the column are therefore likewise simplified.

The breaking of the breakaway link will create an impact energy absorption spike, the energy required for breakage culminating in the energy required for deforming the component. After breakage, only the deformation of the component will absorb the energy of the impact.

Further features and advantages of the present disclosure will become more clearly apparent from reading the following detailed description of one embodiment of the disclosure which is given by way of entirely nonlimiting example and illustrated by the attached drawings in which:
  the breakaway link is a portion of the plastically deformable component and directly links two other portions of this plastically deformable component; thus, the breaking of the breakaway link occurs in such a way that the other two portions remain attached to the plastically deformable component; this then avoids the generation of a broken free part that carries the risk of becoming lodged between the sliding components and of thus perturbing the movement of the sliding components at impact, something which would jam the system;
  the loop is oblong and extends along an axis, known as the loop axis, passing between the first fixing interface and the second fixing interface so that said application of forces in opposite directions can be performed substantially parallel to this loop axis; thus, the loop can be housed between two sliding components of the steering column in a limited amount of space;
  the plastically deformable component comprises a male portion and a female portion, the male portion being housed in the female portion so as to form the breakaway link; thus, assembly is simple and the breakage of the breakaway link occurs by the male portion pulling out of the female portion;
  the female portion comprises a housing of which the entrance comprises a narrowing, and the male portion comprises a head arranged in the housing, the width of the head being less than or equal to the width of the housing but greater than or equal to that of the narrowing, the absorber being arranged in such a way that the breakage of the breakaway link occurs by the head pulling out of the housing as a result of the deformation of the housing with a widening of the narrowing and/or as a result of deformation of the head;
  the plastically deformable component is formed of a strip of sheet metal; this component is easier to produce; it is thus perfectly suited to absorbing impacts by deforming;
  the housing is formed by a notch in a first end of the strip of sheet metal and the male portion is formed by cutting out at a second end of the strip of sheet metal; the plastically deformable component is even simpler to produce;

the cutting-out confers upon the male portion a base bearing said head, the base having a width less than that of the narrowing.

Another subject matter of the disclosure is a steering column comprising:
- a lower base intended to be connected to the chassis of a vehicle,
- an upper tube mounted with the ability to slide on said lower base so as to provide, on the one hand, reach adjustment for a steering wheel intended to be connected to the upper tube and, on the other hand, to allow the upper tube and the lower base to slide relative to one another in the event of an impact,
- a blocking mechanism designed to, in a first state, immobilize the upper tube on the lower base and, in a second state, allow said sliding,
- an absorber according to the disclosure, fixed via the first fixing interface to the upper tube and connected via the second fixing interface to the lower tube.

An impact, notably a frontal impact, is often far stronger than the immobilization force on the blocking mechanism. By virtue of this absorber, in the event of an impact, the energy transmitted to the upper tube will cause it to drop with respect to the lower tube and therefore break the breakaway link, this being followed by the deformation of the plastically deformably component. This energy will thus be absorbed to a very great extent at the start, and then progressively.

In this steering column according to the disclosure, the reach adjustment of the steering column is achieved by means of an electrical actuator mounted on the lower base and driving an endless screw onto which is screwed a drive nut that drives the upper tube, the second fixing interface being fixed to said drive nut; thus, once the adjustment has been made, the nut is fixed on the lower base and holds the second fixing interface in the event of an impact; after the breakaway link has broken, the first fixing interface moves relatively to the second fixing interface, leading to the deformation of the plastically deformable component.

In the present application, the terms "top", "bottom", "lower", "upper", "frontal", "rear", "in front of", "behind", "transverse" refer, unless otherwise indicated, to the orientation of the absorber according to the disclosure or of the steering column, according to the disclosure, that they are intended to have once mounted in a vehicle.

BRIEF DESCRIPTION OF THE DRAWINGS

Further features and advantages of the disclosure will become apparent from reading the detailed description of the nonlimiting examples which follow, for an understanding of which reference will be made to the attached drawings, among which:

FIG. 1 depicts a perspective view of a steering column according to one embodiment of the disclosure;

FIG. 2 depicts a perspective view of an impact energy absorber according to one embodiment of the disclosure, like the one mounted on the steering column of FIG. 1;

FIG. 3 depicts a face-on view of FIG. 2;

FIG. 4 depicts a view of the steering column of FIG. 1 in section on a transverse plane containing the longitudinal axis of this steering column, prior to an impact;

FIG. 5a depicts a side view of the breakaway link of the absorber of FIG. 2, prior to the impact;

FIG. 5b depicts the same view as FIG. 5a but at the start of the impact, at the moment of the peak impact energy absorption;

FIG. 6 schematically indicates the impact absorption dynamics for the entirety of the absorber of FIG. 2, FIG. 7 is a schematic diagram illustrating the curve of absorption of the energy of the impact in the steering column of FIG. 1.

DETAILED DESCRIPTION

FIGS. 1 and 4 illustrate a steering column 10 according to one exemplary embodiment according to the disclosure.

In FIG. 1, the axis X corresponds to the longitudinal axis, the axis Y corresponds to the transverse axis and the axis Z corresponds to the vertical axis.

This steering column 10 is made up of a steering wheel shaft 1, also known as steering shaft, of which the end, on the right in FIG. 1, is intended to accept a steering wheel. This steering shaft 1 is fixed to the upper tube 2 for example, as here, via one or more bearings 8.

The steering column 10 is intended here to be fixed in the vehicle via a steering column support also known as a fairing 3.

The steering column 10 comprises a lower base 5, in this instance in the form of a tube, notably as here more or less rectangular. This lower base 5 is mounted fixed in terms of longitudinal translation on the fairing 3, namely fixed in terms of longitudinal translation along the axis of the steering column A, which also corresponds to the central axis of the steering shaft 1.

Thus, once the steering column 10 is mounted in the vehicle, in this instance in approximately the orientation illustrated in FIG. 1, the fairing 3 is fixed with respect to the chassis and the lower base 5 is fixed in longitudinal translation with respect to this chassis.

In this instance, the lower base 5 is housed in the fairing 3.

The upper tube 2 is mounted with the ability to slide on said lower base 5, so as to allow reach adjustment of the steering wheel. Here, the upper tube 2 is assembled in the lower base 5 by a link of the guideway type.

According to the disclosure, this lower base 5 may further be mounted on the fairing 3 with the ability to rotate about a transverse axis R. This allows heightwise (rake) adjustment of the steering wheel.

The steering column also comprises an impact energy absorber 4.

One exemplary embodiment of this absorber 4 is illustrated in isolation in FIGS. 2 and 3. FIG. 4 more specifically illustrates how this absorber 4 is mounted in the steering column 10.

The absorber 4 comprises two fixing interfaces. The first fixing interface 41 is fixed to the upper tube 2, in this instance to an external side thereof. The second fixing interface 42 is connected to the lower base 5 and may be immobilized with respect to this lower base 5 by a blocking means 9, in this instance on one side of the blocking means 9.

The absorber 4 here is formed as a single component, which is a plastically deformable component. In other words, in this example, the absorber and the plastically deformable component 4 form the one same component.

According to the disclosure, as in this example, this plastically deformable component 4 may be a strip of sheet metal bent over on itself in the form of a loop. For that, the two ends of the strip of sheet metal may be linked together by a breakaway link 40 which therefore closes this loop, the absorber thus being formed of a single piece, namely the strip of sheet metal.

Here, the loop is oblong and extends along an axis, referred to as the loop axis B, between a first loop end 45 and a second loop end 46. As here, these loop ends 45, may be arranged in semicircles linking an external planar part of the loop, at the top in FIGS. 2 and 3, and an internal planar part of the loop, at the bottom in FIGS. 2 and 3. The external planar part bears the second fixing interface 42 and the internal planar part bears the first fixing interface 41.

The planar form of the fixing interfaces 41, 42 means that fixing can be more secure as they can be pressed against the components to which they are fixed.

As can be seen here, the loop axis B passes between the first fixing interface 41 and the second fixing interface 42, which are therefore arranged on either side of the loop, particularly of the loop axis B.

Thus, the application of forces F1, F2 in opposite directions to these fixing interfaces 41, 42 in a direction parallel to this loop axis B tends to cause the loop ends 45, 46 to move apart from one another and stress the breakaway link 40. This application of force in opposite directions comes about by a force that tends to push the upper tube 2 into the lower base 5, when the blocking mechanism 9 is immobilizing the upper tube 2 on the lower base 5.

In this example and in general according to the disclosure, this stress tends to break the breakaway link 40 and to deform the loop, in the sense that beyond a certain threshold, the breakaway link 40 breaks this being followed by deformation of the loop.

In this example, the steering column 10 has electrical reach adjustment. The blocking mechanism 9 is the system that allows both the adjustment and the immobilization of the upper tube 2 on the lower base 5. It can therefore pass from a first state, of immobilizing the upper tube 2, to a second state, of free sliding of the upper tube 2.

For that, the blocking mechanism 9 comprises an electrical actuator 6 fixed to the lower base 5 at one end and fixed at the other end to said second fixing interface 42, via a connection.

This connection here comprises an endless screw 7a of which the axis runs parallel to the steering column axis A, and a drive nut 7b screwed onto the endless screw 7. This endless screw 7a is driven in rotation by the actuator 6, thus driving the movement of the nut 7b along the endless screw 7.

The second fixing interface 42 here comprises two holes 42a, 42b through which pass fixing screws 22a, 22b that fix the second fixing interface 42 to the drive nut 7b.

The fixing screws 22a, 22b have a portion that passes through a slot 51 in the lower base 5, which is arranged so that these fixing screws 22a, 22b are able to slide in this slot 51.

Thus, during reach adjustment, also known as axial adjustment, of the position of the steering wheel, the actuator 6 moves the drive nut 7b along the endless screw 7a. The drive nut 7b drives the absorber 4, the upper tube 2 and the steering shaft 1, which are guided in sliding in the lower base 5.

Once the adjustment has been performed, the actuator 6 is stopped and the drive nut 7b is blocked on the endless screw 7a. The upper tube 2 is therefore immobilized with respect to the lower base 5.

In general, as here, the breakaway link 40 is designed so that the breaking threshold for the breakaway link 40 is higher than the force applied to this breakaway link 40 during adjustment and/or in the event of a low force, such as the driver leaning against the steering wheel.

By definition, this link 40 is a breakaway link because it breaks when a threshold is crossed. This threshold is chosen to correspond to an impact, notably an impact caused by the driver striking the steering wheel in the event of a frontal or rear impact.

According to the disclosure, as in the example illustrated, the breakaway link 40 is formed by two ends of the strip of sheet metal, which are nested in one another in such a way that the breakage of the breakaway link 40 passes via an initial deformation of at least one of these ends.

In this example, this is achieved through the fact that one of the ends forms a male portion 43 and the other a female portion 44. FIG. 5a illustrates an enlargement of this example.

The female portion 44 comprises a housing 44a of which the entrance 44c (visible in FIG. 6 in the drawing at the bottom) comprises a narrowing 44b.

The male portion 43 comprises a head 43a arranged in the housing 44a, the width of the head 43a, illustrated by the large double arrow in FIG. 5a, being less than or equal to the width of the housing 44a but greater than or equal to the width of the narrowing.

These male and female portions 43, 44 may, as here, be formed by cutting of the strip of sheet metal.

For example, the housing 44a is formed by a notch in a first end of the strip of sheet metal.

The male portion 43 may be formed by cutting out at a second end of the strip of sheet metal so as to confer upon the male portion 43 a base 43b bearing said head 43a, the base 43b having a width, illustrated by the small double arrow in FIG. 5a, less than that of the narrowing 44b.

The absorber 4 is arranged in such a way that the breakage of the breakaway link 40 occurs by the head 43 pulling out of the housing 44a as a result of the deformation of the housing 44a with widening of the narrowing 44b and/or as a result of deformation of the head 43a.

In an accident, the drive strikes the steering wheel and this impact therefore leads to force on the steering shaft 1 of the steering column 10 in the direction of the arrow C in FIG. 4. This force is transmitted as far as the absorber 4, in this instance by the bearing 8 and the upper tube 2. Because the second fixing interface 42 is fixed with respect to the actuator 6 and therefore with respect to the lower base 5, the movement of the upper tube 2 inside the lower base 5 can occur only if the absorber 4 deforms.

Two forces F1, F2 are therefore applied along the steering column axis A in opposite directions.

The peak absorption force at the start of the impact occurs as a result of the breakage of the breakaway link 40.

Here, the deformation begins right at the start and is coupled with the breakage of the breakaway link 40. It causes the first loop end 45 formed by the absorber 4 to start to uncurl and the female portion 44 to be pushed along the steering column axis A and toward the bottom of the steering column 10, namely in the direction of the arrow D pointing to the left in FIG. 5b. This causes the male portion 43, in this instance linked to the drive nut 7b, to enter the narrowing 44b of the female portion 44, which is itself linked to the upper tube 2. This narrowing 44b causes each of the two parts that form the housing 44a of the female portion 44 to deform in bending, in this instance parting from one another in the direction of the arrows E toward the top and bottom of FIG. 5b. This deformation continues until the head 43a is out of the housing 44a.

This deformation that allows head 43a to leave the housing 44a therefore combines with the force of the uncurling of the first loop end 45 and generates the force absorption peak.

As can be seen in FIG. 6, in a state E1 preceding the impact, the male part 43 is in the female portion 44; the breakaway link 40 closes the loop.

Upon impact, the breakaway link 40 breaks as explained above and as illustrated in FIG. 5b and then as the upper tube 2 is gradually pushed into the lower base 5, the female portion 44 moves away from the male portion 43. The female portion 44 therefore forms a moving strand and the male portion 43 forms a fixed strand.

Here, this manifests itself in the fact that the fixing interfaces 41, 42 move closer to one another, thus uncurling the strip of sheet metal. This uncurling occurs at the first loop end 45 and is manifested by this loop end progressing along the strip of sheet metal. This uncurling here leads to the movement of the second loop end 46, which bears the female portion 44, toward the bottom of the steering column 10, namely toward the left in FIG. 6, without appreciable deformation of the second loop end 46.

This uncurling after breakage of the breakaway link 40, that is found in states E2 and E3, corresponds to a lesser and more progressive absorption of the impact.

FIG. 7 provides a visual depiction of the force absorption peak P, upon said breakage, followed by the subsequent progressive absorption. By way of illustration, the ordinate axis represents the force applied to the upper tube 2 via the steering wheel, in newtons, and the abscissa axis depicts the pushing of the upper tube 2 into the lower base 5, in millimeters.

The force generated can be controlled through various parameters of the absorber 4, particularly: the material of the strip, the thickness and width of the male portion 43, the width of the entrance 44c of the housing 44a, the cross sections of the zones that deform in bending, the coefficient of friction between the male portion 43 and the female portion 44.

Also, the strip of sheet metal may comprise longitudinal openings 47, 48 that allow the modulation of the absorption force as the loop uncurls.

The advantage is that of having a peak force absorption system incorporated directly into the absorber 4 without having an additional component. The force can easily be adjusted to suit different vehicles by modifying one of said parameters of the absorber 4.

The force can also be easily adjusted for series production by adjusting the width of the opening in the female portion according to the material used to manufacture the plastically deformable component.

Note that the first fixing interface 41 may, as in this example, also comprise holes 41a, 41b to allow fixing to the upper tube 2 using screws 21a, 21b.

According to a variant of the disclosure, in place of a deformation in bending of the two parts of the female portion 44 that form the narrowing, the breakaway link 10 may be designed in such a way as to essentially break, that is, only under the effect of a striction deformation of the male part 43 as it enters the narrowing of the female portion 44 when the latter moves. In this case, the bending deformation of the two parts of the female portion 44 that form the narrowing 44b may be blocked using rigid components arranged on the outside of the female portion 44, thus constraining the latter in such a way that the entrance 43c to the housing 43a maintains its width. The absorption force can be decreased by making a through hole in the head 43a, making it easier to crush.

Although here the female portion 44 is the mobile portion fixed to the lower tube 2, in an embodiment variant which has not been depicted, the breakaway link may be arranged with the female portion fixed to the lower base and the male portion forming the mobile portion fixed to the lower tube.

In a variant which has not been depicted, the loop may be arranged in such a way that the first loop end is positioned toward the bottom of the column, whereas the second loop end, which does not undergo appreciable deformation, is arranged toward the top of the column. Thus, after breaking, the first loop end will uncurl downward and away from the second loop end which will itself remain fixed in position to the lower base.

Note that according to a variant which has not been depicted, in place of a deformation that allows the male portion to exit the female portion, the breakaway link could be formed by a locally small cross section of the plastically deformable component which breaks when placed under sufficient stress, notably in the event of an impact. After breakage, the loop is open and has two ends that move away from one another as the absorber uncurls.

The invention claimed is:

1. A steering column impact energy absorber comprising:
   a plastically deformable component forming a loop;
   a breakaway link closing the loop on itself;
   a first fixing interface; and
   a second fixing interface, the first and second fixing interfaces being distinct from the breakaway link and arranged on either side of the loop,
   wherein the plastically deformable component and the breakaway link are arranged in such a way that application of forces in opposite directions to the first fixing interface and to the second fixing interface respectively causes a stress that tends to cause the loop to deform, the breakaway link to break, and the deformation of the loop to continue after said breakage.

2. The absorber as claimed in claim 1, wherein the breakaway link is a portion of the plastically deformable component and directly links two other portions of the plastically deformable component.

3. The absorber as claimed in claim 1, wherein the loop is oblong and extends along a loop axis passing between the first fixing interface and the second fixing interface so that said application of forces in opposite directions is performed substantially parallel to the loop axis.

4. The absorber as claimed in claim 1, wherein the plastically deformable component comprises a male portion and a female portion, the male portion being housed in the female portion so as to form the breakaway link.

5. The absorber as claimed in claim 4, wherein:
   the female portion comprises a housing defining an entrance having a narrowing, and
   the male portion comprises a head arranged in the housing, a first width of the head being less than or equal to a second width of the housing but greater than or equal to a third width of the narrowing, the absorber being arranged in such a way that the breakage of the breakaway link occurs by the head pulling out of the housing as a result of deformation of the housing with a widening of the narrowing and/or as a result of deformation of the head.

6. The absorber as claimed in claim 5, wherein:
   the plastically deformable component is formed of a strip of sheet metal, the housing is formed by a notch in a first end of the strip of sheet metal, and the male portion is formed by cutting out at a second end of the strip of sheet metal.

7. The absorber as claimed in claim 6, wherein the cutting out includes a base having said head, the base having a fourth width that is less than the third width of the narrowing.

8. The absorber as claimed in claim 1, wherein the plastically deformable component is formed of a strip of sheet metal.

9. A steering column comprising:
a lower base configured to be connected to the chassis of a vehicle;
an upper tube slidably mounted on said lower base so as to provide reach adjustment for a steering wheel configured to be connected to the upper tube and to allow the upper tube and the lower base to slide relative to one another in the event of an impact;
a blocking mechanism configured to, in a first state, immobilize the upper tube on the lower base and, in a second state, allow the upper tube and the lower base to slide relative to one another; and,
an absorber comprising:
a plastically deformable component forming a loop;
a breakaway link closing the loop on itself;
a first fixing interface; and
a second fixing interface, the first and second fixing interfaces being distinct from the breakaway link and arranged on either side of the loop,
wherein the plastically deformable component and the breakaway link are arranged in such a way that application of forces in opposite directions to the first fixing interface and to the second fixing interface respectively causes a stress that tends to cause the loop to deform, the breakaway link to break, and the deformation of the loop to continue after said breakage, and
wherein the absorber is fixed via the first fixing interface to the upper tube and connected via the second fixing interface to the lower tube.

10. The steering column as claimed in claim 9, wherein the reach adjustment of the steering column is achieved via an electrical actuator driving an endless screw onto which is screwed a drive nut that drives the upper tube, the second fixing interface being fixed to said drive nut.

* * * * *